United States Patent [19]

Vu et al.

[11] Patent Number: 4,804,734

[45] Date of Patent: Feb. 14, 1989

[54] POLYURETHANE COMPOSITION CONSISTING ESSENTIALLY OF A POLYETHER DIOL, A POLYETHER TRIOL, GLYCEROL, AND A POLYISOCYANATE

[75] Inventors: Cung Vu, Gaithersburg; Richard C. Hartwig, Laurel, both of Md.

[73] Assignee: W. R. Grace & Co.-Conn., New York, N.Y.

[21] Appl. No.: 101,215

[22] Filed: Sep. 25, 1987

Related U.S. Application Data

[63] Continuation-in-part of Ser. No. 053,930, May 26, 1987, abandoned, which is a continuation-in-part of Ser. No. 020,914, Mar. 2, 1987, abandoned.

[51] Int. Cl.$^4$ .................. C09K 3/00; C08G 18/12; C08G 18/66
[52] U.S. Cl. .................. 528/54; 528/58; 528/60; 528/55; 528/56; 252/182.25
[58] Field of Search .................. 528/60, 54, 58

[56] References Cited

U.S. PATENT DOCUMENTS

| | | | |
|---|---|---|---|
| 3,310,533 | 3/1967 | McElroy | 528/50 |
| 3,748,315 | 7/1973 | Sidney et al. | 428/425.8 |
| 3,933,759 | 1/1976 | Hoeschele | 528/45 |
| 3,939,222 | 2/1976 | Dieterich | 525/458 |
| 3,941,855 | 3/1976 | Ehrhard | 528/76 |
| 3,993,576 | 11/1976 | Barron | 252/182 |
| 4,049,636 | 9/1977 | Mao et al. | 528/58 |
| 4,066,397 | 1/1978 | Carroll | 528/58 |
| 4,081,429 | 3/1978 | Wyman et al. | 528/48 |
| 4,101,473 | 7/1978 | Lander | 524/31 |
| 4,124,573 | 11/1978 | Watabe et al. | 528/58 |
| 4,126,741 | 11/1978 | Carleton et al. | 528/54 |
| 4,131,604 | 12/1978 | Szycher | 528/79 |
| 4,137,200 | 1/1979 | Wood et al. | 521/159 |
| 4,225,696 | 9/1980 | Colpitts et al. | 528/76 |
| 4,376,834 | 3/1983 | Goldwasser et al. | 521/159 |
| 4,400,497 | 8/1983 | Blum et al. | 528/45 |
| 4,404,258 | 9/1983 | Loewrigkeit et al. | 528/424.6 |
| 4,410,597 | 10/1983 | Nishino et al. | 428/423.1 |
| 4,433,128 | 2/1984 | Wick | 528/54 |
| 4,436,862 | 3/1984 | Tetenbaum et al. | 524/445 |
| 4,520,042 | 6/1985 | Smith | 528/54 |
| 4,525,570 | 6/1985 | Blum et al. | 528/75 |
| 4,554,188 | 11/1985 | Holubka et al. | 427/393.5 |
| 4,559,366 | 12/1985 | Hostettler | 528/60 |

FOREIGN PATENT DOCUMENTS 0062987 5/1980 Japan.
2147910 5/1985 United Kingdom.

OTHER PUBLICATIONS

PU Paints and Coatings, H. Koch et al., Hanser Publishers, p. 525 (1985).

Primary Examiner—Harold D. Anderson
Assistant Examiner—Dennis R. Daley
Attorney, Agent, or Firm—Charles A. Cross; W. W. McDowell, Jr.

[57] ABSTRACT

Two-component polyol/polyisocyanate composition especially useful as an abrasion-, heat-, and corrosion-resistant automotive undercoating. The polyol component comprises glycerol, a polypropylene oxide glycol, and a polypropylene oxide triol. The polyisocyanate component comprises MDI (diphenylmethane-4,4'-diisocyanate), plus a poly(oxypropylene) glycol capped with MDI.

8 Claims, No Drawings

POLYURETHANE COMPOSITION CONSISTING ESSENTIALLY OF A POLYETHER DIOL, A POLYETHER TRIOL, GLYCEROL, AND A POLYISOCYANATE

This application is a continuation-in-part of U.S. application having Ser. No. 053,930, filed May 26, 1987, which is a continuation-in-part of U.S. application having Ser. No. 020,914, filed Mar. 2, 1978, both now abandoned.

This invention relates to the field of polyurethane resins and coatings made therefrom. More particularly, the invention is directed to making a novel polyurethane resin by reacting together two components, viz., a specific polyol mixture with a specific polyisocyanate prepolymer in the presence of a catalyst system. The resin has special utility as an automotive underbody coating.

BACKGROUND OF THE INVENTION

Two-component mixes for the preparations of polyurethane resins are well known. As a matter of fact, in an elemental sense, the first polyurethane resins were made by mixing two components, which is to say, by reacting together a polyol as one component and a diisocyanate as the other. This concept has become greatly refined and elaborated on during the subsequent growth of the polyurethane resin industry, and various two-component mixes have been reported, where one component comprises a prepolymer of polyols and the other one or more diisocyanates, one or more of which may be in prepolymeric form. The individual components may be capped; that is, the polyols may be wholly or partially terminated by isocyanate groups, and the isocyanate reactant (in the other component) may be wholly or partially terminated by a polyol. Two-component mixes are described, for example, in U.S. Pat. Nos. 4,410,597 and 4,101,473 (these same two patents disclose our preferred catalyst combination of dibutyl tin dilaurate —"DBTDL"— and triethylene diamine —"DABCO"—, as used in our Example 1; see below). U.S. Pat. No. 4,410,597 further discloses polyurethane coatings made with certain isocyanates and acrylic esters. Resistance to acids and warm water is claimed. Polyol mixtures are known, e.g., polyethylene glycol and trimethylolpropane, in U.S. Pat. No. 4,137,200, Example 1. That patent also discloses solvent-free two-component mixes. Such mixes are also mentioned in *P U Paints and Coatings*, H. Koch et al, Hanser Publishers, p. 525 (1985), which reference recommends two-component spray equipment in view of the resins' short pot life and high viscosity. Such equipment is available commercially and is useful in applying the resin of the present invention.

Polyurethane coatings are known for use in the auto industry; see UK Patent Application No. 2,147,910A, published May 22, 1985; and U.S. Pat. Nos. 4,554,188, 4,400,497 and 4,525,570.

TABLE I provides a summary check list of additional relevant U.S. patents, with an indication of their relevance. Some of these patents are discussed at more length below.

U.S. Pat. No. 4,225,696 —Colpitts et al— makes an isocyanate-terminated prepolymer by reacting an isocyanate with a polyether diol: 1/40; 3/15. (Indicia are to column/line in the patent.) The isocyanate can be MDI (diphenylmethane 4,4′-diisocyanate) (2/68), the diol can be poly(oxypropylene) glycol (2/45). The prepolymer is cured with a diol, polyol or a mix (1/43). The polyol may be glycerine (2/53) and/or poly(oxypropylene) triol (2/55). Formulation IV (5/25) has 3 polyols plus MDI. (The MDI is actually a mix with unidentified "adducts".) DBTDL catalyst is used (4/29). (Resistance to thermal distortion is mentioned, but the reference is merely to body heat, i.e., a dental plate.)

In Colpitts' formulation (his Table, col. 5) the ratio of polyols/isocyanate, i.e., A/B, is always about 1.

U.S. Pat. No. 4,376,834 —Goldwasser et al— makes a prepolymer with MDI (5/18) and a polyether polyol (6/33), with MW greater than 500 (6/15) and a functionality 2–4 (6/48). The prepolymer is reacted with a 3-polyol mix comprising a triol and a diol (6/49) and glycerol (8/30). See, e.g., Goldwasser's TABLE III. A/B in Example 1 is 0.62, in Examples 2 and 3, 0.54, and Example 4, 0.65. The other examples appear to give about the same or lower ratios. Example 9 describes humidity tests on a coating made with MDI, 1,4-butanediol, neopantyl glycol, and a polytetramethylene glycol. Substantial gains in weight and loss in Izod impact were reported.

Polyol mixes are not new, though our particular three in their particular proportions do indeed appear novel as Component A.

In addition to U.S. Pat. No. 4,225,696 to Colpitts and U.S. Pat. No. 4,376,834 to Goldwasser, other patents disclose 3-polyol mixes, e.g.:

U.S. Pat. No. 3,993,576 —Examples 15 and 16 show glycerine plus an adduct of glycerine with propylene oxide end-capped with ethylene oxide plus a solubilizer for the polyols, i.e., an adduct of an alkylene glycol with an alkylene oxide. In separate statements, the high-molecular weight polyols have hydroxy equivalent weights of 650–3,000 and 2–4 hydroxyl groups per molecule. Mixtures are included (1/30–36), including glycerine (1/43).

U.S. Pat. No. 4,131,604 uses a 3-polyol mix, but one of the polyols is required to be polytetramethylene ether glycol, which we do not have. Also, the diisocyanate must be aliphatic.

Thermal Properties

Patents indicating polyurethanes (P U's) with some sort of thermal properties include:
U.S. Pat. No. 3,310,533 —P U m.p. is 182°–190° C.;
U.S. Pat. No. 3,748,315 —coatings cured at 150°–240° C. (3/29);
U.S. Pat. No. 3,933,759 —"rapid cures at 170°–200° C." (8/66), Example 1, 195° C. for 5 minutes;
U.S. Pat. No. 3,939,222 —Example 4, coated steel plate hardened at 210° C. for 2 minutes was wear-resistant, had good adhesion;
U.S. Pat. No. 3,941,855 —tempering cast P U at 140°–180° C.;
U.S. Pat. No. 4,081,429 —stable at 200° F.;
U.S. Pat. No. 4,124,573 —TABLE II shows stability at over 185° C.;
U.S. Pat. No. 4,225,696 —refers to thermal stability but means merely body heat;
U.S. Pat. No. 4,376,834 —cures at 250° C. (4/36);
U.S. Pat. No. 4,404,258 —P U coating on PVC stable at 100° for 5 days;
U.S. Pat. No. 4,436,862 —adds clay for "thermal stability", but this means stable storage at 14° C. for over 1 month.

Other References:
U.S. Pat. No. 3,748,315 —also mentions "weatherometer" tests.
The isocyanate is MDI plus an isocyanurate plus a polyester.
U.S. Pat. No. 4,520,042 and Japanese PN No. 137,143 —disclose our preferred catalyst system.
U.S. Pat. Nos. 4,049,636, 4,066,397, and 4,689,385—disclose compositions similar to Applicants'.

TABLE I

Check List of Certain Prior U.S. Patents

| U.S. Pat. No. | MDI-Prepol[1] | Reacts Prepol. with Polyols[2] | Polyol Mix[3] | DBTDL Cat.[4] | Tri-Ethylene Diamine Cat. | Mentions "Thermal" |
|---|---|---|---|---|---|---|
| 3,310,533 | | | | | | x |
| 3,654,106 | x | | | | | |
| 3,748,315 | | | | | | x |
| 3,915,937 | x | | | | | |
| 3,933,759 | x | | | x | | x |
| 3,939,222 | x | | | | | x |
| 3,941,855 | | | | | | x |
| 3,993,576 | | | x | | | |
| 4,081,429 | | | | | | x |
| 4,082,703 | x | | | x | | |
| 4,124,573 | x | | | x | x | x |
| 4,131,604 | | | x | | | |
| 4,225,696 | x | x | x | | | |
| 4,376,834 | x | x | x | x | | x |
| 4,404,258 | x | | | | | x |
| 4,436,862 | | | | | | x |
| 4,532,316 | x | | | | | |
| 4,551,498 | x | | | x | | |
| 4,604,445 | x | | | | | |

[1]makes a prepolymer with MDI and a poly(oxypropylene) glycol;
[2]reacts that prepolymer with a polyether-diol-triol glycerine mix;
[3]polyol mix in some ways resembles our Component A;
[4]dibutyl tin dilaurate catalyst.

BRIEF DESCRIPTION OF THE INVENTION

Our novel polyurethane resin is made by mixing together two components, herein Components A and B.

Component A consists essentially of
(i) a major amount of a polyether diol based on propylene oxide and containing only secondary hydroxyl groups (herein PPG). This material has a molecular weight of about 1,000. It is available commercially from various sources, e.g., as NIAX (Trademark) PPG-1025 from Union Carbide Corp.;
(ii) a polypropylene oxide-based polyether triol containing only secondary hydroxyl groups, molecular weight about 1,000 herein (PPT), available commercially from various sources, e.g., as NIAX (Trademark) LG-168 from Union Carbide Corp., and preferably less than the amount of PPG;
(iii) a relatively small amount of glycerol; and
(iv) a polymerization/crosslinking catalyst system.

Component B consists essentially of diphenylmethane 4,4'-diisocyanate (MDI) plus a polyisocyanate prepolymer made by reacting together MDI with a poly(oxypropylene) glycol, as more particularly hereinafter described.

A and B are mixed, then immediately applied as a coating to the intended substrate. The coating is tack-free in minutes and (when applied to steel) cures rapidly to a film with excellent adhesion, abrasion resistance and heat stability.

DETAILED DESCRIPTION OF THE INVENTION

The two components, A and B, will first be further described.

Component A

Component A is a novel homogeneous liquid mixture of three polyols. These three polyols are quite specific as to structure, molecular weight and relative proportions. Numerous trials have shown that minor variations in any of these respects will produce inferior coatings. Each of the three polyols is well known and has been used in making polyurethane resins. The combination of the three in accordance with this invention, however, is believed unique and novel.

As mentioned, the major polyol component is PPG, a polyether diol based on propylene oxide and containing only secondary hydroxyl groups. The average molecular weight can vary in the range 400 to 4,000 and is preferably about 1,000. This polyol is available commercially from various sources, e.g., as PPG-1025 from Union Carbide Corp.

Also, as mentioned, the second polyol of Component A is PPT, a polypropylene-oxide based polyether triol containing only secondary hydroxyl groups with an average M.W. in the range of about 500 to 3,000, and preferably about 1,000. This polyol is available commercially from various sources, e.g., as NIAX LG-168 from Union Carbide Corp.

Both the two polyols aforesaid can be made by reaction of propylene oxide with the appropriate alcohol, using procedures well known in the art.

The third polyol is glycerol.

A two-component catalyst is used as below described. The two catalyst components are known in the polyurethane art for use individually or together.

To prepare Component A, the three polyols and the two catalysts are simply mixed together in a pot.

Component B

The polyisocyanate prepolymer component of Component B is made in the known way by reacting together diphenylmethane 4,4'-diisocyanate (MDI) with a poly(oxypropylene) glycol of the formula:

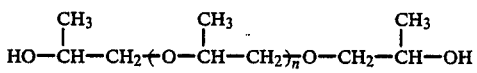

The value of n lies between 0 and 3, approximately indicating that the material is a mixture, probably with small amounts of higher and lower molecular weight polymers of the same genus. In the main reaction the MDI end-caps both ends of the poly(oxypropylene) glycol. The prepolymer thus formed may also contain small amounts of other products of the reaction, containing isocyanate and/or hydroxy groups. The prepolymer is typically $K\text{-}O\text{-}(CH_2CH[CH_3]O)_m\text{-}K$, where K is

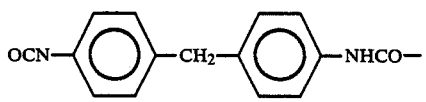

and m is about 2–5. In general, Component B may be described as an MDI/polyisocyanate material comprising about 45–50 weight % MDI with the balance being the described prepolymer, i.e., with some prepolymer molecules being relatively small and others larger (depending generally on the amount of capped polyoxypropylene), but with the averages being substantially as above enumerated.

Whereas MDI is a solid, and is very difficult to handle in spray apparatus, the above described MDI/polyisocyanate prepolymer is a homogeneous liquid and is readily sprayed. In the interests of brevity, this "B" mixture (or solution) is herein from time to time referred to as polyisocyanate prepolymer, MDI/Prepolymer, or simply as Component B. It is available from various sources, e.g., as Mondur XP-744 from Mobay Corporation.

The Catalyst

The preferred catalyst is equal weights of dibutyl tin dilaurate (DBTDL) with triethylenediamine (DABCO). However, substantially any of the conventional polyurethane catalysts (and combinations) can be used.

These catalysts include:
Tertiary amines:
  Triethylene diamine
  N-methyl morpholine
  N-ethyl morpholine
  Diethyl ethanolamine
  N-coco morpholine
  1-methyl-4-dimethylamino ethyl piperazine
  3-methoxy-N-dimethyl propyl amine
  N-dimethyl-N'-methyl isopropyl propylene diamine
  N,N-diethyl-3-diethyl amino propylamine
  N,N-dimethyl benzyl amine
  Dicyclohexylmethylamine
  2,4,6-tris dimethylaminomethylphenol
  N,N-dimethyl cyclohexylamine
  Triethylamine
  Tri-n-butylamine
  1,8-diaza,bichloro[5,4,0]-undecene-7
  N-methyl diethanolamine
  N,N-dimethyl ethanolamine
  N,N-diethyl cyclohexylamine
  N,N,N'N'-tetramethyl-ethylene diamine
  1,4-diaza-bicyclo-[2,2,2]-octane
  N-methyl-N'-dimethylaminoethyl-piperazine
  Bis-(N,N-diethylaminoethyl)-adipate
  N,N-diethylbenzylamine
  Pentamethyldiethylene triamine
  N,N,N',N'-tetramethyl-1,3-butanediamine
  1,2-dimethylimidazole
  2-methylimidazole
Tin compounds:
  Stannous chloride
  Dibutyl tin di-2-ethyl hexoate
  Stannous octoate
  Dibutyl tin dilaurate
  Trimethyl tin hydroxide
  Dimethyl tin dichloride
  Dibutyl tin diacetate
  Dibutyl tin oxide
  Tributyl tin acetate
  Tetramethyl tin
  Dimethyl dioctyl tin
  Tin ethyl hexoate
  Tin laurate
  Dibutyl tin maleate
  Dioctyl tin diacetate
Other metal organics:
  Zinc octoate
  Phenyl mercuric propionate
  Lead octoate
  Lead naphthenate
  Copper naphthenate As to the amount of catalysts(s), the preferred amount of tertiary amine catalyst is about 0.01 to 3%, based on the total weight of polyols plus polyisocyanate. When using a tin compound or other metal-containing catalyst, an equal amount is suitable. Mixtures of tertiary amines and organo-metallics are particularly suitable as catalysts for this invention.

Mixing Components A and B—Application to Substrate

For small batches, A and B can be mixed in an open container at room temperature. Reaction occurs very quickly, forming the desired polyurethane resin, which can then be spread on a substrate, using paint brush, roller or like applicator. For production work (and the resin is designed for this) a conventional two-liquid air spray gun gives best results.

Application is suitably made at room temperature. The resin can be applied at higher temperatures, if desired, e.g., 80°–100° F. The coated article is tack-free within minutes and cures at room temperature without being heated. However, it is not harmed by subsequent conventional baking steps that may occur in an auto assembly line.

For our tests, the mix of Component A/Component B was coated on 4"×12" steel panels that had been electrocoated with a conventional primer composition (an "E" coat), e.g., one commercially available from PPG Industries under the tradenames "3150" or "3150A". The invention coatings were fully cured at room temperature prior to testing.

Additives

Various conventional materials which are inert to the formation of the polyurethane resin from the two Components A and B can be added, e.g., thixotropic agents, anti-oxidants, antiblistering agents, reinforcing agents (fibers, platelets, crosslinkers, latexes), thickeners, plasticizers, UV stabilizers, powdered pigments, fumed silica, barytes, carbon black, titanium dioxide and the like; pigment dispersants; corrosion inhibitors and so on. These materials can be added to A, to B or the mix of A and B, in amounts ranging from about 0.1 to 25% by weight of the total mix.

The Substrate

Although our novel polyurethane resin is designed primarily for the automotive industry, as an undercoating for steel frames, rocker panels, wheel wells, etc., the resin is also a useful coating for nonferrous articles (Al, Cu, Mg), wood, fabrics, concrete, plastics, rubber, glass, ceramics, fiber, paper and the like. The resin of the invention is also useful as an undercoating for rail equipment (locomotives, coaches, freight cars, street cars, subway cars), buses, ships and farm equipment. It is particularly useful in coating substrates exposed to salt and marine environments. Such substrates include steel structures for highways and bridges exposed to road salt as well as interior and exterior steel surfaces on ships and other structures on or near oceans or inland salt lakes. It can be used as a primer, an intermediate coating or as a final coating. It is paintable; i.e., after curing, it can be painted with conventional paints.

As we have mentioned, a particularly useful application is as an automotive undercoating. In view of the commercial importance of this use, we list some requirements currently in demand in the automobile industry.

The resin system should:
(1) be solventless;
(2) be readily sprayable, at room temperature or at elevated temperatures;
(3) provide a tack-free coating within a few minutes, e.g., dry to touch within 30 minutes;
(4) povide a fully cured coating within 24 hours;
(5) provide a coating with excellent adhesion;
(6) provide a coating with excellent abrasion resistance;
(7) provide a coating with no sag at a minimum of 10 mils dry; and
(8) provide a coating that is stable through the paint oven conditions.

Our coatings meet the above criteria in all essential respects.

Although the auto industry has not so far required any substantial degree of corrosion-resistance in resin systems of this type (such resistance being conventionally supplied by electrocoated primers - "E-coats"- ), we have found that our coatings are extremely salt-fog corrosion resistant when applied to bare steel (see Corrosion Tests and Example 20 below). Thus, in certain instances when applying our coatings, it is possible to dispense with the conventional E-coat primer.

Our coatings thus combine resistance to abrasion, heat, and salt-fog corrosion.

The following examples illustrate without limiting the invention.

EXAMPLE 1

In this example Component A was:

| Polyols | |
|---|---|
| Glycerol | 3.1 g |
| PPT | 33.5 g |
| PPG | 150.0 g |
| Catalysts | |
| Dibutyl tin dilaurate | 0.281 g |
| Triethylenediamine | 0.281 g |

Component B was:

| MDI/Prepolymer | 94.0 g |
|---|---|

All polyols and catalysts were mixed together to form Component A. As soon as the two Components A and B were mixed, the reaction occurred instantaneously. The polyurethane was coated on panels and became tack-free within minutes. The dry abrasion result for this material was good (12 mils/542 seconds), and the peel strength was excellent (22.2 ppi). The material could not be peeled from the panel.

EXAMPLE 2

The procedure of Example 1 was followed.
In this example Component A was:

| In this example Component A was: | |
|---|---|
| Polyols | |
| Glycerol | 6.2 g |
| PPT | 133.0 g |
| PPG | 200.0 g |
| Catalysts | |
| DABCO | 0.53 g |
| DBTDL | 0.53 g |
| Component B was MDI/Prepolymer | 188.0 g |

Properties:
Abrasion, 16.2 mils/533 seconds

EXAMPLE 3

The procedure of Example 1 was followed.
In this example,
Component A was:

| Polyols | |
|---|---|
| Glycerol | 6.2 g |
| PPT | 200.0 g |
| PPG | 100.0 g |
| Catalysts | |
| DABCO | .49 g |
| DBTDL | .49 g |

Component B was:

| MDI/Prepolymer | 188.0 g |
|---|---|

Properties:
Abrasion, 15.5 mils/344 seconds

EXAMPLE 4

Carbon Black Formulation

The composition and process of Example 1 was used except that 0.5 weight percent carbon black based on the total mix was thoroughly mixed into Component A before mixing Component A with Component B. The mixture of Components A and B was sprayed on panels. The mix was found to be readily sprayable in both airless (2,000 psi) and air-assisted airless (600–1,000 psi) sprayers, at 80° F. and 100° F. The film did not sag at thickensses up to 20 mils and was dry to touch in 30 minutes. The film was black, with low gloss, and the cured panel (like those of the preceding examples) was readily paintable. Cured panels baked at 180° C. for 1¼hours were relatively unaffected.

Variation in Component A/Component B Ratio

The Component A/Component B weight ratio is critical and can be varied only with a narrow range, viz., about 1.8–2.2/1. Ratios substantially below and above this range result in coatings with poor abrasion resistance. TABLE II shows the effect of A:B (Polyols:MDI/Prepolymer) variation on abrasion resistance.

TABLE II
EFFECT OF POLYOLS:ISOCYANATE PREPOLYMER (A:B) RATIO ON ABRASION PROPERTIES

| Example | Polyols:Isocyanate Prepolymer Wt. Ratio | Abrasion Results (microns/secs) | Equivalent secs at 15 mils |
|---|---|---|---|
| 5 | 1.5:1 | 612/117 | 72.8 |
| 6 | 1.6:1 | 513/99 | 73.5 |
| 7 | 1.8:1 | 565/358 | 241.9 |
| 8 | 2.1:1 | 682/2114 | 1180.9 |
| 9 | 2.2:1 | 477/1230 | 982.4 |
| 10 | 1.5:1 | 419/196 | 178.2 |
| 11 | 1.6:1 | 356/169 | 180.9 |
| 12 | 1.8:1 | 477/385 | 307.2 |
| 13 | 2.1:1 | 243/235 | 367.2 |
| 14 | 2.2:1 | 244/246 | 384.4 |
| 15 | 3.0:1 | (tacky) | |
| 16 | 2.5:1 | (tacky) | |

NOTES:
1. Except for the variations stated, all examples followed the formulation and procedure of Example 1. Examples 5-9 contained 0.5% carbon black. In Examples 10-14 the catalyst level was 50% of the amount in Example 1, and the formulation contained 5% fumed silica.
2. All panels were cured at room temperature for 30 minutes, then at 130° C. for 10 minutes, then at room temperature for 30 minutes, then at 175° C. for 20 minutes, then again at room temperature for 30 minutes and finally at 135° C. for 25 minutes.
3. No blistering was observed of any of the panels.
4. Abrasion tests were made per "Shot-Blaster" procedure described elsewhere herein. Coating thickness and time to fail in test were taken in micron/seconds and also converted to equivalent seconds at 15 mils. To make this conversion, actual seconds were multiplied by 15 and the result divided by actual mils (1 mil = 25.4 microns). Endurance of 15 mil-coating for at least 200 seconds is taken as passing the abrasion test. For example, in Example 5 (15 × 117)/(612/25.4) = 72.8 seconds = failed the test.

More Comparative Runs (not the invention)

In the following runs Component A consisted of only 2 polyols, viz., 6.2 g glycerol plus the stated second polyol; plus 0.1 weight percent DABCO catalyst and 0.1 weight percent DBTDL catalyst, based on the weight of the total mix. Component B was 188 g MDI/Prepolymer in the first four runs and was 91.35 g toluene diisocyanate in the last three. All resulting polyurethane coatings failed in one or more essential respects, as stated. These runs confirm our findings that 3 polyols are required in our Component A, having regard to the other ingredients to the mix.

| Run | Second Polyol | Comments | Abrasion[1] Dry Test (except as stated) |
|---|---|---|---|
| a | Diol, M.W. = 2,000, 800 g | Very sticky | — |
| b | PPG, 400 g | Slow curing | 15.1/604 dry 17/744 wet |
| c | Triol, M.W. = 4,800, 1,280 g | Brittle | 8.6/175 |
| d | PPT, 266 g | Very hard | 11/134 |
| e | Diol, M.W. = 2,000, 800 g | Very sticky | — |
| f | PPG, 400 g | Tacky | 13.3/92 |
| g | Triol, M.W. = 4,800, 1,280 g | Brittle | 12/19 |

[1]Mils/seconds - see "Abrasion Test", below.

In another run ("Run h") the conditions were the same as in Example 1, except that MDI was used instead of MDI/Prepolymer. The coating remained tacky after several days.

Heat Stability

The sample from the formula of Example 1 was tested for heat stability by using the thermal gravimetric analysis method (TGA), at the rate of 2° C./minutes. Loss was gradual until about 300° C. (50 minutes in the oven), at which point weight loss increased. However, even at 310° C. (55 minutes in the oven under the test conditions of 2° C./minute) weight loss was less than 10% for all samples.

Test data are given in TABLE III.

TABLE III
WEIGHT RETENTION OF COATED STEEL PANELS IN OVEN WITH TEMPERATURES INCREASED AT 2° C./MINUTE

| Oven Temperature °C. | Time in Oven Min. | % of Original Weight Retained | | |
|---|---|---|---|---|
| | | Example 17 Cured at 20° C. | Example 18 Cured at 100° C. | Example 19 Cured at 200° C. |
| 210 | 5 | 99.25 | 99.6 | 99.25 |
| 250 | 25 | 98.47 | 99.3 | 98.4 |
| 290 | 45 | 95.6 | 97.2 | 95.6 |
| 310 | 55 | 91.1 | 92.2 | 90.625 |

Component A/Component B ratios in the range 2-2.2/1 give the best heat stability. Ratios below 2/1, e.g., 1.8/1, tend to blister when heated to 200°–300° C. for 1 hour. (However, as shown in Examples 7 and 12, TABLE II, the 1.8/1 formulations, when cured at 130° C. for 10 minutes, then at 175° C. for 20 minutes and 135° C. for 25 minutes, give excellent films with no blistering. Temperatures higher than 175° C. are not commonly encountered in auto bake cycles.)

The heat stability of our 2-2.2/1 coatings is considered unusual, compared to that of similar auto undercoatings, commercial or proposed to be commercial, as shown in TABLE IV. In making these tests, duplicate panels were coated with the indicated materials. Then one of the duplicates was (a) cured at ambient conditions and then tested for abrasion resistance; and the other was (b) baked at 200° C. for 1 hour and then tested for abrasion resistance. The P U coating of this invention was the best of those tested. As a further curious point, our coating was more abrasion resistant after the 200° C. bake than after simple ambient curing; the opposite was true for the other coatings.

TABLE IV

| | | Abrasion Results | |
|---|---|---|---|
| | | Abrasion Resistance[1] (mil/sec) | |
| Coating | Thickness (microns) | After ambient cure | After 200° C./60 min. bake |
| PVC[2] | 500 | 3/25 | degraded[3] 0/3 |
| PVC[2] | 300 | 1/35 | degraded[3] 0/3 |
| P U[4] | 430 | 1/0 | 0/20 |
| P U[5] | 300 | 0/20 | 0/20 |
| P U[6] | 300 | 7/30 | 10/15 |

[1]Sablux Abrasion Test (see "Abrasion Tests", below);
[2]polyvinylchloride samples cured for 15 min. at 100° C., 20 minutes at 130° C. before test;
[3]burned away during test, left with about 130 micron thickness;
[4]a 2-component polyurethane product made in Germany;
[5]a 2-component polyurethane product made in France;
[6]this invention.

SALT-FOG CORROSION TESTING

The test described here is routinely used to determine resistance of coatings to corrosive conditions resulting from road salt, marine environments, and the like.

The Salt-Fog Chamber

The panels were tested in a chamber consisting of a tank for collection and recycle of spray-drip, a rack positioned over the tank to hold the panels in a position slightly inclined from the vertical, and a removable "roof" or cap of transparent plastic, which rested in a trough surrounding the top of the tank and permitted a view of the panels. (A chamber of this type, known as the Singleton SCCH Corrosion Test Cabinet, is available from the Singleton Corp., Cleveland, Ohio.)

A salt water mist or fog was fed constantly into the chamber by means of air bubbling through an upright cylinder containing a 5% aqueous sodium chloride solution.

The interior of the salt-fog chamber was maintained at 100° F. and 100% relative humidity throughout the test.

Panel Preparation

The panels were steel, about 10 cm wide and varying in length from about 13 to 35 cm. They were about 1 mm thick. The panels as purchased carried a standard "E" coating. An elongated area of the E coating, about 1.5 cm wide, was removed down the center of the panels, by sandblasting. This left a strip of bare metal down the length of the center. Then about two-thirds of the panel area were coated with the polyurethane formulation of Example 1. The coating (about 0.25-0.38 mm thick) was allowed to cure as in Example 1; then the panel was placed in the chamber rack.

As noted, the panels tested were steel. However, the test (and our coatings) is applicable to rust-prone ferrous metals generally. The protection is against the formation of rust (iron oxides and hydroxides) on the coated surface.

Test Results (Example 20)

The panels were maintained in the salt-fog chamber for about 2,000 hours. During this period the panels were removed from time to time and examined. The examination included carefully slicing away small sections of the polyurethane layer and examining the panel surface below, especially in the abraded, bare metal area. Where protected by our coating, the surface continued bright and shining throughout the entire test period. The abraded area without the protection of our coating showed gross corrosion, including conversion to red and black iron oxides. All panels showed surface iron oxide discoloration seeping down from the top edges of the panels, which edges were totally exposed, with no coating protection. None of this discoloration penetrated our coating, thus further demonstrating the protective character of our material.

The test period of 2,000 hours is required by certain auto makers as a primer for auto underbody coatings, and is the most stringent such test known to us. Our coatings meet this requirement easily.

An abbreviated salt-fog test may be used in association with an abrasion test, as desribed under "Abrasion Test", below.

Some Variables

Workable and preferred amounts of the component ingredients are given in TABLE V. All parts are by weight.

TABLE V

| | Workable[1] (About:) | Preferred (About:) |
|---|---|---|
| COMPONENT A | | |
| Polyols | | |
| Glycerol | 8 to 15 | 10 |
| PPT | 100 to 450 | 120 |
| PPG | 175 to 575 | 535 |
| Catalysts | | |
| DBTDL | (2) | 1 |
| DABCO | (2) | 1 |
| COMPONENT B | | |
| MDI/Prepolymer | 300 to 400 | 335 |

[1]Workable means that amounts in this range give polyurethane resin coatings with substantially the properties stated in the list of automotive requirements given above.
[2]The above ranges are based on the two catalyst components, each at a weight of 1. However, the two catalyst components can vary, each with respect to the other, within the range of 0.5-5 to 1 (holding all other ingredients constant).

The proportions in TABLE V are subject to the overriding requirement that the Component A/Component B ratio be about 1.8-2.2/1 and preferably about 2/1. Thus, one cannot simply take the Component A minima (which add to 289) and divide that sum by the Component B range of 300-400, since at both ends of the 300-400 range the ratio falls well below 1.8/1. Adjustments (increases) would have to be made in Component A to bring the ratio up into the 1.8-2.2/1 range. Likewise, the individual maxima given for all 3 polyols in Component A could not be taken, as the A/B ratio at lowest would substantially exceed 2.2. Either the total of A would have to be reduced, or B would have to be increased, or both.

Abrasion Tests

The coatings are tested for abrasion resistance in both the dry and wet state on a Shot Blaster manufactured by Auer, Mannheim, West Germany (Model StrahlanlageST800A). The wet coatings to be tested are soaked in a water bath for 24 hours prior to abrasion testing.

The Shot Blaster abrasion test is the same for both the dry and wet panels. The test consists of shot blasting the urethane polymer coated panel (positioned vertically) with a crushed spherical cast steel shot type GP-14 Wheelabrator-Allevard at an air pressure of 35 psi at an angle of 60° unitl full penetration of the coating to expose bare steel is visibly noted. (In the Sablux Test, TABLE IV, conditions are substantially the same except that the panel is positioned horizontally.) For dry or wet sample of 15-mil thickness, a blasting period in excess of 200 seconds is considered commercially acceptable. The actual results are rarely exactly 15 mils or 200 seconds, but are readily extrapolated to these criteria. Thus, in Example 1, where a coating of 16.2 mils endured to 533 seconds, this is equivalent to $(200\times 16.2)/533 = 6.1$ mils for 200 seconds or $(15\times 533)/16.2 = 15$ mils for 494 seconds.

To simulate different environmental conditions, panels with a cured coating of Example 1 (average thickness of 0.015") were conditioned for 24 hours separately at room temperature; at $-30°$ C.; at $100°$ F. and 100 relative humidity.

The cured panels were then subjected to a dry gravelometer abrasion test in accord with SAE J-400 with 5 pints of gravel. The thus abraded panels were then placed in a salt fog chamber (a Singleton SCCH Corrsion Test Cabinet, manufactured by the Singleton Corp., Cleveland, Ohio). The Salt Spray (Fog) Test was run in accord with the procedure of ASTM B117-73. The cabinet contained a salt solution of 5 parts by weight NaCl in 95 parts distilled water and was maintained in the exposure zone at a temperature in the range $33.3°-36.1°$ C. The exposure time in the cabinet was 24 hours. On examination of the panel for rust spots, none were found.

Standard commercial underbody coating compositions based on mineral filled polyvinylchloride plastisols required a coating thickness of 0.040" in order to prevent similar damage of the electrocoat coating leading to the onset of corrosion.

Peel Test (Adhesion)

A strip of brass screen (0.020 mesh), 1"×10", is taped to both ends of electrocoated steel panels (1"×5") leaving an excess of screen at one end. The mixes of Components A and B from Examples 1-4 were each applied to a separate panel through the screen to mesh with the panel substrate and then allowed to cure. After curing, the tape was removed from the end with the excess screen allowing it to be peeled at 180° from the panel. The average peeled adhesion measured for these coatings is around 22.2 pounds per linear inch (ppi).

By visual analysis, the materials remained bonded to the panel with the excess remaining on the screen.

We claim:

1. The composition consisting essentially of two separate components, A and B; Component A consisting essentially of, in parts by weight, about 175 to 575 of polyether diol based on propylene oxide and containing only secondary hydroxyl groups, average molecular weight about 400 to 4,000; about 100 to 450 of polyether triol based on propylene oxide and containing only secondary hydroxyl groups, average molecular weight about 500 to 3,000; glycerol about 8 to 15; polyurethane catalyst about 1 to 10; and Component B consisting essentially of about 300 to 400 parts by weight of a polyisocyanate material consisting essentially of about 45-50 weight % of diphenylmethane-4,4'-diisocyanate, and balance to make 100% of $K-O(CH_2CH[CH_3]O)_m-K$ where K is

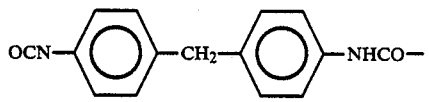

and m is about 2-5.

2. The composition according to claim 1 in which the polyether diol is about 535 parts and has a molecular weight of about 1,000; the polyether triol is about 120 parts and has a molecular weight of about 1,000; glycerol is about 10 parts; the polyurethane catalyst consists of dibutyl tin dilaurate about 1 part and triethylene diamine about 1 part; and the polyisocyanate material is about 335 parts.

3. The composition of claim 1 containing in addition at least one additive selected from the group consisting of thixotropic agents, anti-oxidants, antiblistering agents, reinforcing agents, thickeners, plasticizers, UV stabilizers, pigments, extenders, pigment dispersants and corrosion inhibitors in amounts ranging from about 0.01 to 25% by weight of the total composition.

4. The composition according to claim 3 in which the additive is 0.5 weight percent carbon black.

5. A polyurethane resin, said resin being the product obtained by reacting together Component A and Component B, as defined in claim 1.

6. The polyurethane resin according to claim 5 in which the polyether diol is about 535 parts and has a molecular weight of about 1,000; the polyether triol is about 120 parts and has a molecular weight of about 1,000; glycerol is about 10 parts; the polyurethane catalyst consists of dibutyl tin dilaurate about 1 part, and triethylene diamine about 1 part; and component B is about 335 parts.

7. A process of forming a polyurethane resin comprising intimately mixing together two components, A and B; Component A and Component B being as defined in claim 1.

8. The process according to claim 7 in which, in parts by weight, the polyether diol is about 535 parts and has a molecular weight of about 1,000; the polyether triol is about 120 parts and has a molecular weight of about 1,000; glycerol is about 10 parts; The polyurethane catalyst consists of dibutyl tin dilaurate about 1 part and triethylene diamine about 1 part; and Component B is about 335 parts.

* * * * *